March 8, 1966  R. C. BUELER  3,238,851
APPLICATION VALVE
Filed Jan. 17, 1964
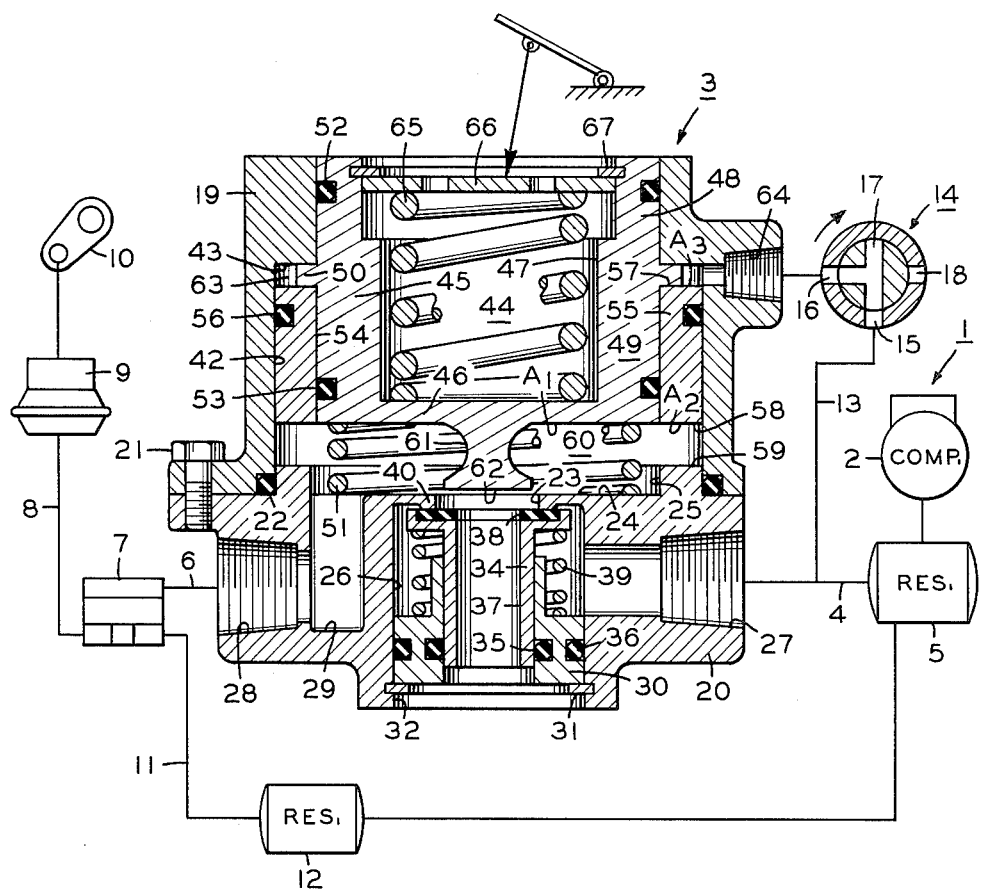
INVENTOR
RICHARD C. BUELER
BY
Joseph C. Pajes … # 3,238,851
APPLICATION VALVE
Richard C. Bueler, Glendale, Mo., assignor to Wagner Electric Corporation, St. Louis, Mo., a corporation of Delaware
Filed Jan. 17, 1964, Ser. No. 338,366
9 Claims. (Cl. 91—434)

This invention relates to application valves for fluid pressure systems and in particular to ratio-changing application valves.

In the past, disadvantageous features effecting undesirable increases in vehicle air brake system sensitivity which, in most instances, deleteriously affected desirable air brake system controllability, i.e., the vehicle operator's ability to control the applicaction valve treadle position and/or treadle force, have been a subject of interest and concern since precise braking controllability is essential to safe vehicle operation, and on larger commercial vehicles, such as tractors and/or trailers for instance, undesirable increases in sensitivity acutely affected braking controllability when such vehicles were operated substantially empty or without load. For example, the foundation brakes for such larger vehicles were necessarily designed to have a braking capacity great enough to adequately meet maximum braking demands or requirements when said vehicle was subjected to maximum loads, and as a resulting disadvantageous feature, said vehicle was greatly overbraked when empty or subjected to minimum loads which served to increase braking sensitivity and decrease braking controllability. Similarly, the suspension systems for such larger vehicles were necessarily designed to provide a satisfactory vehicle ride when subjected to maximum vehicle loads, and as another resulting disadvantageous feature, a rather stiff or sharp vehicle ride was provided in response to minimum vehicle loads which also tended to increase braking sensitivity and decrease braking controllability. In a large measure, the aforementioned disadvantageous features inherent to brake design and suspension design for larger vehicles were, in combination, responsible for the undesirable variations in braking controllability experienced as vehicle loads increased or decreased.

The past air application valves were generally designed to provide maximum performance for the vehicle operator at maximum vehicle loads which effected both maximum braking sensitivity and maximum braking controllability, and as a resulting disadvantageous feature, the performance of such application valves decreased in response to minimum vehicle loads. In other words, the disadvantageous features of braking design and suspension design, i.e., overbraking and stiff riding, contributed to braking sensitivity with a resulting decrease in braking controllability in response to minimum vehicle loads or braking loads to amplify or supplement the disadvantageous feature of the application valves, i.e., poorer or decreased performance. Increased braking sensitivity generally served to seriously impair the vehicle operator's ability to exercise the necessary precise control on the application valve and, therefore, decreased braking controllability or erratic vehicle braking resulted. In other words, as the vehicle or braking load decreased, the corresponding braking pressure required to effect proper or desirable vehicle deceleration and/or a complete stop also decreased, and the vehicle operator's ability to immediately adapt or adjust to the reduced application valve treadle reaction force accompanying such reduced braking pressure was generally insufficient to provide continuous and effective braking controllability and to prevent "overshooting" or applying more braking pressure than necessary to effect such desired vehicle deceleration. In this manner, increased braking sensitivity with a corresponding decreased braking controllability effected by the disadvantageous features of brake and suspension designs at minimum vehicle loads amplified or supplemented the disadvantageous feature of reduced application valve performance at minimum vehicle loads to accentuate the vehicle operator's inability to adjust to such conditions whereby any "overshooting" unintentionally effected by the vehicle operator served to immediately lock the vehicle brakes resulting in undesirable vehicle skidding and/or vehicle hopping.

Also in the past, application valves were employed in air brake systems in conjunction with ratio-relay valves, and an operator applied treadle force on said application valve metered fluid pressure from a source thereof to actuate said ratio-relay valve. The ratio-relay valve was responsive to the metered fluid pressure to apply fluid pressure from the aforementioned source or an auxiliary source to actuate a fluid pressure responsive motor for controlling energization of the vehicle brakes. Further the ratio-relay valve was selectively operable to apply fluid pressure to the motor in a direct proportion or a ratio proportion to that metered thereto from the application valve. Another disadvantageous feature was that the operator was afforded a direct feel through the application valve only of the fluid pressure metered to the ratio-relay valve and was not necessarily afforded a direct feel as to the extent of the actual braking application. For instance, if the ratio-relay valve was selectively positioned to effect a ratio braking application, the operator could only feel the metered fluid pressure through the application valve while the fluid pressure actually applied by the ratio-relay valve to effect the braking application was less than the magnitude of the metered fluid pressure. Still another disadvantageous feature was that the applied fluid pressure from the ratio-relay valve could never attain the maximum valve of the source connected therewith even through the operator metered full reservoir or source fluid pressure through the application valve to said ratio-relay valve when said ratio-relay valve was selectively positioned for a ratio braking application. For instance, under emergency conditions, it was instinctive for the operator to meter or dump full source fluid pressure to the ratio-relay valve, and if the operator had forgotten that the ratio-relay valve was selectively positioned for a ratio braking application, then the actual applied fluid pressure from said ratio-relay valve could never attain the magnitude of the fluid pressure metered to said ratio-relay valve from said application valve.

An object of the present invention is to provide an application valve which overcomes the aforementioned disadvantageous features.

Another object of the present invention is to provide an application valve in which the performance thereof is adjustable to minimize increased braking sensitivity and decrease braking controllability effected by the undesirable features of vehicle brake and suspension design.

Another object of the present invention is to provide an application valve having satisfactory operating characteristics to provide good braking sensitivity and controllability under both loaded and unloaded vehicle conditions.

Another object of the present invention is to provide an application valve in a vehicle fluid pressure system which is at all times operable to effect maximum energization of the vehicle brakes in accordance with the available maximum fluid pressure of said system.

Another object of the present invention is to provide a unitary application valve of compact and simplified construction which compatibly combines the application and ratio changing features or characteristics of separate application and ratio changing valves.

Another object of the present invention is to provide an application valve for a fluid pressure system which compatibly combines the application and ratio changing features or characteristics of separate application and ratio changing valves without appreciably increasing the inherent time lag of said system.

Still another object of the present invention is to provide a ratio changing application valve for a vehicle fluid pressure system which is responsive to selectively operable means to provide both a full or non-ratio braking effect and a reduced or ratio braking effect.

Still another object of the present invention is to provide a ratio changing application valve in which a direct feel or appraisal as to the extent of the braking application is afforded the operator during a full or non-ratio braking application and also during a reduced or ratio braking application.

These and other objects and advantages will become apparent hereinafter.

Briefly, the invention comprises an application valve in a fluid pressure system including a pair of application means concertly movable in response to a manually applied force thereon to establish an output fluid pressure, the magnitude of the output fluid pressure acting on said application means in opposition to said manually applied force, and means for disabling one of said application means, the other of said application means being further movable in response to the manually applied force to establish an output fluid pressure acting only on said other application means in opposition to the manually applied force and having a magnitude different than that of the output fluid pressure acting on both of said application means.

The invention also consists in the parts and arrangement and combination of parts hereinafter described and claimed in the following specification, reference being had to the accompanying drawing which forms a part of the specification and wherein like numerals refer to like parts wherever they occur.

In the drawing which illustrates an embodiment of the invention,

The drawing illustrates a diagrammatic view of a fluid pressure system showing an application valve therein in cross section embodying the present invention.

Referring now to FIGURE 1 in detail, a fluid pressure system 1 is provided with a compressor 2 which is connected to an inlet port of a control or application valve 3 by a conduit 4 having a reservoir 5 interposed therein, said compressor and reservoir defining, in combination, a source of fluid pressure. Another conduit or service line 6 is interposed between an outlet port of the application valve and the control port or portion of a relay valve 7 of the usual self-lapping type well known in the art and effective to apply fluid pressure in a direct proportion, i.e., 1:1, to that metered thereto, and another conduit 8 is connected between the outlet port or portion of said relay valve and a fluid pressure responsive motor or brake chamber 9 which is operatively linked with a slack adjuster 10 for controlling energization of a friction device or wheel brake assembly (not shown). The inlet port or portion of the relay valve 7 is connected with the reservoir 5 by a conduit 11, and another reservoir, such as an auxiliary reservoir 12, is interposed therein. To complete the system 1, another conduit 13 is interposed between a ratio port in the application valve 3 and the conduit 4, and a two-way hand or ratio valve 14 is provided with connecting ports 15, 16 serially connected in the conduit 13. Passage means 17 normally provide open pressure fluid communication between the conduit 4 and reservoir 5 and the ratio port of the application valve 3; however, the hand valve 14 may be rotated clockwise (in the direction of the arrow) to position passage means 17 between the connecting port 16 and an exhaust 18 thereby interrupting pressure fluid communication between the ratio port of the application valve 3 and the conduit 4 and venting said ratio port to the atmosphere.

The application valve 3 is provided with upper and lower housings 19, 20 connected together by suitable means, such as studs 21 and an O-ring seal 22 is sealably interposed between said housings.

The lower housing 20 is provided with a bore or connecting passage 23 defining an annular housing wall 24 axially positioned between upper and lower counterbores 25, 26, said lower counterbore defining a reservoir or inlet chamber. A reservoir or inlet port 27 which receives the conduit 4, as previously mentioned, is provided in the housing 20 connecting with the counterbore 26, and an outlet port and passage 28, 29 which receives the conduit 6, as previously mentioned, is provided in said housing connected with the counterbore 25. A valve guide member 30 is positioned against displacement from the counterbore 26 by a snap ring and groove assembly 31 provided adjacent the lower end of said counterbore which also serves as an exhaust port 32. The valve guide member 30 is provided with an axial bore 33 therethrough in which a valve element 34 is slidably received, and seals 35, 36 are carried in said valve guide member in sealing engagement with said valve element and the counterbore 26. The valve element 34 is provided with an axial bore or exhaust opening 37 therethrough, and an annular resilient seal or disc 38 is carried on the upper end of said valve element in circumscribing relation with said exhaust opening. A valve return spring 39 is biased between the valve element 34 and the valve guide member 30 normally urging the valve seal 38 into sealing engagement with a valve seat 40 which is formed on the housing wall 24 at the juncture of the bore 23 and counterbore 26.

The upper housing 19 is provided with an axially aligned bore and counterbore 41, 42 defining an annular shoulder 43 therebetween. A reaction piston 44 is provided with an axially extending sleeve portion 45 integrally formed with a radially extending wall 46 adjacent the lower end thereof and defining a stepped metering spring bore 47 in said reaction piston. The sleeve 45 is provided with an upper end portion 48 which is slidable in the housing bore 41 and a lower end portion 49 which extends into the counterbore 42, and an annular flange 50 is integrally formed on said sleeve between said upper and lower end portions thereof. A reaction piston return spring 51 is interposed between the reaction piston end wall 46 and the housing wall 42 normally urging the reaction piston 44 to its inoperative position with the flange 50 thereof in abutting engagement with the housing shoulder 43. Seals 52, 53 are carried in the upper and lower ends 48, 49 of the reaction piston sleeve 45 in sealing engagement with the housing bore 41 and a bore 54 of an annular ratio piston 55 slidably received on said lower end of said sleeve. Another seal 56 is carried in the peripheral surface of the ratio piston 55 in sealing engagement with the counterbore 42, said ratio piston having an annular upper end 57 for engagement with the flange 50 of the reaction piston 44 and an annular lower end 58 for engagement with a cooperating stop 59 provided on the lower housing 120. An outlet chamber 60 is defined in the housing counterbores 25, 42 between the housing wall 24 and the reaction and ratio pistons 44, 55. It should be noted that the reaction piston 44 is provided with an effective cross-section area or a reaction area $A_1$ in the outlet chamber 60, and the ratio piston 55 is provided with an effective cross-sectional area or reaction area $A_2$ in said outlet chamber. An extension 61 is integrally provided on the reaction piston end wall 46 for movement through the housing bore 23, and a valve seat 62 is provided on the lower end of said extension for sealing engagement with the valve element seal 38, said seat being normally spaced from said seal by the return spring 51.

A ratio chamber 63 is defined between the housing counterbore 42 and the reaction piston sleeve 45 and between the housing shoulder 43 and the upper end 57 of the ratio piston 55. It should be noted that the ratio piston 55 is provided with an effective cross-sectional area or reaction area $A_3$ in the ratio chamber 63 which is opposed and substantially equal to the reaction area $A_2$ of said ratio piston in the outlet chamber 60. A ratio port 64 which receives the conduit 13, as previously mentioned, is also provided in the housing 19 in open pressure fluid communication with the ratio chamber 63 adjacent to the housing shoulder 43. To complete the description of the application valve 3, a pre-compressed metering spring 65 is biased between the reaction piston end wall 46 and a treadle force receiving plate 66 slidably received in the upper end of the reaction piston metering spring bore 47, said plate being retained against displacement by a snap ring and groove assembly 67 provided in the reaction piston 44 adjacent the upper end of said bore.

In the operation, assume that the component parts of the application valve 3 are positioned as above described and that the hand valve 14 is rotated clockwise (in the direction of the directional arrow) to a position connecting the ratio port 64 of said application valve with the atmosphere to effect a reduced or ratio application, such as for instance, when the vehicle is empty or subjected to minimum load conditions. A manually applied treadle force $M_r$ by the operator on the force receiving plate 66 of the piston 44 concertly moves the pistons 44 and 55 downwardly in the housing bore and counterbore 41 and 42 against the compressive force of the return spring 51 to sealably engage the extension valve seat 62 with the valve element 34 thereby closing the exhaust passage 37 and isolating the outlet chamber 60 from the atmosphere. Further concert downward movement of the pistons 44 and 55 disengages the valve element 34 from the valve seat 40 on the housing wall 24 to establish pressure fluid connection between the inlet and outlet ports 27 and 28. The established or output fluid pressure $P_r$ flows from the reservoir through to the conduit 4, the inlet port 27, the inlet chamber 26, the connecting bore 23, the outlet chamber 60 and passage 29 into the outlet port 28 and therefrom through the service line 6 to consequently actuate the relay valve 7. The relay valve 7 is responsive to the fluid pressure $P_r$ metered thereto by the application valve 3 to effect the application of fluid pressure from the auxiliary reservoir 12 through the conduit 11 to the conduit 8 to actuate the brake chamber 9 which, in turn, rotates the slack adjuster 10 to energize the wheel brake assembly associated therewith (not shown). As previously noted, the relay valve 7 is of the self-lapping type well known to the art wherein the magnitude of the output or delivery fluid pressure therefrom is substantially equal to the fluid pressure $P_r$ controllably metered thereto by the application valve 3. Since the hand valve 14 is positioned to obviate the flow of pressure fluid to the ratio chamber 63 of the application valve 3 from the reservoir 5 through the conduits 4, 13 and to vent said ratio chamber to atmosphere, as previously mentioned, the fluid pressure $P_r$ so established in the outlet chamber 60 acts on the additive effective areas $A_1$ and $A_2$ of the reaction and ratio pistons 41 and 55, respectively, creating a reaction force $F_r$ substantially equal to and in opposition to the manually applied force $M_r$ on said reaction and ratio pistons, i.e., $M_r = F_r = P_r((A_1+A_2))$.

When the reaction force $F_r$ equals the manually applied force $M_r$, the reaction and ratio pistons 44 and 55 are concertly moved upwardly against the metering spring 65 wherein the valve element 34 is positioned in lapped engagement with the housing valve seat 40 and the reaction piston valve seat 62 is positioned in lapped engagement with said valve element. The reaction force $F_r$ acting through the metering spring 65 against the manually applied force $M_r$ on the plate 66 affords the operator a direct and accurate "feel" as to the extent of the braking effort or application. If a greater braking effort is desired, the manually applied force $M_r$ is increased, and the component parts of the application valve 3 and system 1 function in the same manner, as previously described, to again move the component parts of said application parts to their lapped positions.

When the desired braking effort is attained, the manually applied force $M_r$ is removed from the force receiving plate 66 of the reaction piston 44, and the compressive force of the return spring 51 and the reaction force $F_r$ concertly moves the reaction and ratio pistons 44 and 55 upwardly to their original or inoperative positions; therefore, the valve return spring 39 also moves the valve element 34 upwardly toward its original position. Initially this upward movement sealably re-engages the valve element 34 with the housing valve seat 40 to again interrupt pressure fluid communication between the inlet and outlet ports 27 and 28, and further concert upward movement of the reaction and ratio pistons 44 and 55 disengages the reaction piston valve seat 62 from said valve element to re-establish connection between the outlet and exhaust ports 28 and 32 to exhaust the fluid pressure $P_r$ from the relay valve 7 through the service line 6, the outlet port and passage 28 and 29, the outlet chamber 60, the connecting bore 23, the valve element exhaust opening 37 and said exhaust port to the atmosphere. In this manner, exhaustion of the fluid pressure $P_r$ from the outlet chamber 60 eliminates the reaction force $F_r$, and the relay valve 7 is responsive to such pressure fluid exhaustion to again interrupt pressure fluid communication between the auxiliary reservoir 12 and brake chamber 9 to vent the applied fluid pressure from said brake chamber through the conduit 8 to atmosphere thereby de-actuating said brake chamber and effecting de-energization of the wheel brake assembly associated therewith.

If the operator desires a full or non-ratio braking application such as, for instance, when the vehicle is carrying an excessively heavy load or maximum load, the operator rotates the hand valve 14 in a counterclockwise direction (opposite of the directional arrow), to a position aligning the passage means 17 between the connection ports 15 and 16 thereof. In this manner, pressure fluid communication between the ratio port 64 of the application valve 3 and the atmosphere is interrupted, and the ratio chamber 63 is placed in pressure fluid communication with the reservoir 5 through the ratio port 64, the conduit 13, the connection ports and passage means 15, 16 and 17, respectively, of the hand valve 14 and the conduit 4. When the ratio chamber 63 is placed in pressure fluid communication with the reservoir 5, as above described, the fluid pressure in said ratio chamber acts on the effective area $A_3$ of the ratio piston 55 to move said ratio piston downwardly in the housing counterbore 42 to a disabled position in abutting engagement with the stop or shoulder 59 of the housing 20. In this manner, a manually applied force M by the operator on the plate 66 of the reaction piston 44 moves said reaction piston independently of the disabled ratio piston 55 to actuate the valve element 34 and meter an established or output fluid pressure P from the application valve 3 to relay valve 7 which, in turn, applies fluid pressure to actuate the brake chamber 9, as previously described. Since the ratio piston 55 is disabled, the fluid pressure so established in the outlet chamber 60 is effective on only the effective area $A_1$ of the reaction piston 44 to create a reaction force F substantially equal to and in opposition to the manually applied force M on said reaction piston, i.e., $M = F = P(A_1)$. In other words, the tank or reservoir fluid pressure acting on the ratio area $A_3$ is greater than, or at least equal to the established fluid pressure P acting on the reaction area $A_2$; therefore, the reaction force F acts through the metering spring 65 against the manually applied force on the plate 66 to afford the operator a direct and accurate "feel" as to the extent of the non-ratio braking application. It should be noted that the output fluid pressure P is greater than the output fluid pressure $P_r$ and in ratio therewith by the proportion of the reaction areas:

$$\frac{A_1+A_2}{A_1} \text{ or } \frac{A_1+A_2}{A_1+(A_2-A_3)}$$

From the foregoing, it is apparent that the application valve 3 affords the operator a direct and accurate appraisal or "feel" as to the extent of both the non-ratio and ratio braking applications. In other words, the output fluid pressures P and $P_r$ act on the effective reaction areas $A_1+A_2$ and $A_1$ of the reaction and ratio pistons 44 and 55 to create reaction forces F and $F_r$ in direct opposition to the manually applied forces M and $M_r$, respectively.

It is apparent that the application valve 3 provides the operator with a greater treadle stroke while also providing an increased reaction area during a ratio braking application to enhance the performance characteristics thereof for controlling lighter or lesser output fluid pressures $P_r$. In other words, this increased performance of the application valve 3 for controlling relatively smaller output fluid pressures $P_r$ during a ratio braking application when the vehicle is subjected to minimum load conditions counteracts the increased sensitivity of the vehicle braking system normally effected by overbraking and stiff riding at such minimum vehicle load conditions.

It is also apparent that the application valve 3 can be manually actuated to meter or "dump" full reservoir pressure into the system 1 even through operating under ratio conditions. For instance, under emergency conditions, the operator might forget that the hand valve 14 is set for a ratio braking application; however, the application valve 3 affords a direct and accurate "feel" as to the extent of the braking application, and the operator can still meter full reservoir pressure into the system by merely increasing the manually applied force on said application valve. In this manner, the application valve 3 is operable either during a ratio or non-ratio braking application to effect maximum energization of the vehicle brakes in accordance with the available maximum fluid pressure of the system 1.

It is also apparent that application and ratio changing features or characteristics of separate application valves and ratio changing valves are compatibly combined in the application valve 3, and since these features are combined in a unitary valve construction, the inherent system time lag is substantially obviated in comparison with the utilization of separate application and ratio changing valves in a system.

It is apparent that a novel system and application valve meeting the objects set out hereinbefore are provided and that changes and modifications as to the precise configurations, shapes and details set forth in the disclosure by way of illustration may be made by those skilled in the art without departing from the spirit of the invention as defined by the claims which follow.

The embodiments of the invention in which an exclusive property or privilege is claimed are defined as follows:

1. In a fluid pressure system having a fluid pressure source and a fluid pressure responsive motor, an application valve for controlling the application of fluid pressure from said source to said motor comprising a pair of application means concertedly movable in response to a manually applied force to effect the application of fluid pressure from said source to said motor, the applied fluid pressure acting on said application means in opposition to the manually applied force, one of said application means having a portion for selective connection with said source and the atmosphere in opposition to the applied fluid pressure, said one application means being independently movable to a disabled position in said application valve upon subjection of said portion to the fluid pressure at said source, and the other of said application means being thereafter independently movable to effect the application of fluid pressure from said source to said motor wherein said applied fluid pressure acts only on said one application means in opposition to the manually applied force.

2. In a fluid pressure system having a fluid pressure source and a fluid pressure responsive motor, an application valve for controlling the application of fluid pressure from said source to said motor comprising a pair of application means, said application means being concertedly movable in response to a manually applied force to effect the application of fluid pressure from said source to said motor, a pair of reaction areas on said application means, another area on one of said application means in opposed relation to the reaction area thereof and for selective subjection to the fluid pressure of said source and the atmosphere, said reaction areas being responsive to applied fluid pressure to oppose concert movement of said application means by the manually applied force when said other area is subjected to the atmosphere, said one application means being independently movable to a disabled position in said application valve upon the subjection of said other area to the fluid pressure at said source, and the other of said application means being thereafter independently movable to effect the application of fluid pressure from said source to said motor wherein the applied fluid pressure acts only on the reaction area of said other application means in opposition to the manually applied force.

3. In a fluid pressure system comprising a fluid pressure source and a fluid pressure responsive motor, an application valve for controlling the application of fluid pressure from said source to said motor including a pair of application means, said application means being concertedly movable in response to a manually applied force thereon to effect the application of fluid pressure from said source to said motor, a pair of fluid pressure responsive reaction areas on said application means responsive to applied fluid pressure acting thereon to oppose the manually applied force, a fluid pressure responsive ratio area on one of said application means in opposition to the reaction area thereof, means for selectively subjecting said ratio area to fluid pressure at said source and the atmosphere, said one application means being independently movable to a disabled position in said application valve when said ratio area is subjected to the fluid pressure at said source and the other of said application means being thereafter independently movable to effect the application of fluid pressure from said source to said motor wherein the applied fluid pressure acts only on the reaction area thereof in opposition to the manually applied force.

4. In a fluid pressure system having a fluid pressure source and a fluid pressure responsive motor, an application valve for controlling the application of fluid pressure from said source to said motor comprising a housing, a pair of piston means concertedly and independently movable in said housing, means within said housing including said pair of piston means defining pressure fluid flow passage means for connection between said source and motor, valve means controlling said flow passage means, said piston means being concertedly movable in response to a manually applied force to engage and move said valve means to a position establishing pressure fluid flow through said flow passage means, a pair of reaction areas on said piston means responsive to the magnitude of the established pressure fluid flow to oppose the concerted movement of said piston means by the manually applied force, another area on one of said piston means in opposition to the reaction area thereof for selective subjection to the fluid pressure at said source and the atmosphere, said one piston means being movable independently of the other of said piston means to a disabled position in said housing upon the subjection of said other area to the fluid pressure at said source, and said other piston means being thereafter movable independently of said one piston means to actuate said valve means and establish pressure fluid flow through said flow passage means having a magnitude different than that of the first established pressure fluid flow and acting on only the reaction area of said other piston means in opposition to the manually applied force.

5. In a fluid pressure system comprising a fluid pressure source and a fluid pressure responsive motor, an application valve for controlling the application of fluid pressure from said source to said motor including a housing, means within said housing providing pressure fluid flow passage means connected between said source and motor, valve means controlling said flow passage means, a pair of manually operable piston means in said housing and adapted for concert and independent movement, said piston means being concertedly movable in response to a manually applied force to engage and move said valve means to a position effecting the application of fluid pressure through said flow passage means from said source to said motor, a pair of reaction areas on said piston means responsive to the magnitude of the fluid pressure applied to said motor to oppose concerted movement of said piston means by the manually applied force, said piston means defining with said housing an expansible fluid pressure ratio chamber, a ratio area in said ratio chamber on one of said piston means in opposition to the reaction area thereof, and other means connected between said chamber and source including selectively operable means for subjecting said ratio area to the atmosphere and to fluid pressure from said source having a magnitude at least as great as that applied to said motor and acting on the reaction area of said one piston, said one piston means being movable independently of the other of said piston means to a disabled position in said housing in response to the fluid pressure in said chamber acting on said ratio area and said other piston means being thereafter independently movable when said one piston is in the disabled position to actuate said valve means and apply fluid pressure to said motor having a magnitude greater than that of the first applied fluid pressure and acting on only the reaction area of said other piston means to oppose movement thereof by the manually applied force.

6. A manually controlled application valve for fluid pressure comprising a housing having inlet and outlet ports therein, valve means controlling pressure fluid communication between said ports, and a pair of valve control means concertedly and independently movable in said housing for controlling said valve means, said valve control means being concertedly movable in response to a manually applied force to engage and move said valve means to a position establishing pressure fluid communication between said inlet and outlet ports, the established fluid pressure at said outlet port acting on said valve control means to oppose further concerted movement thereof, a portion of one of said valve control means for selective subjection to a fluid pressure and the atmosphere and in opposed relation to the established fluid pressure at said outlet port acting on said one valve control means, said one valve control means being independently movable to a disabled position upon the subjection of said portion to fluid pressure and the other of said valve control means being thereafter independently movable in response to the applied force to actuate said valve means and establish another fluid pressure at said outlet port acting on only said other valve control means in opposition to the manually applied force.

7. A manually actuated application valve for fluid pressure comprising a housing having inlet, outlet, exhaust and ratio ports therein, valve means controlling pressure fluid communication between said inlet, outlet and exhaust ports, a pair of valve control means movable in said housing, said valve control means being concertedly movable in response to a manually applied force to engage and move said valve means to a position interrupting pressure fluid communication between said outlet and exhaust ports and establishing pressure fluid communication between said inlet and outlet ports, a reaction area on each of said valve control means responsive to the established fluid pressure to oppose the manually applied force, a ratio area on one of said valve control means opposing the reaction area thereof for selective subjection to the atmosphere and a fluid pressure at said ratio port, said one valve control means being independently movable to a disabled position in said housing in response to fluid pressure at said ratio port acting on said ratio area and being in excess of that at said outlet port, and the other of said valve control means being thereafter independently movable to adjust the magnitude of the fluid pressure at said outlet port acting only on the reaction area of said other valve control means in a predetermined ratio with that of the fluid pressure at said outlet port acting on the reaction areas of both of said valve control means in opposition to the manually applied force.

8. A manually actuated application valve for fluid pressure comprising a housing having inlet, outlet, exhaust and ratio ports therein, valve means controlling pressure fluid communication between said inlet, outlet and exhaust ports, a pair of valve control members movable in said housing, resilient means connected with one of said valve control members, said valve control members being concertedly movable in response to a manually applied force on said resilient means to engage and move said valve means to a position interrupting pressure fluid communication between said outlet and exhaust ports and establishing pressure fluid communication between said inlet and outlet ports, and a reaction area on each of said valve control members and responsive to the established fluid pressure at said outlet port, a ratio area on the other of said valve control members in opposition to the reaction area thereof for selective subjection to the atmosphere and a fluid pressure at said ratio port, said valve control members being concertedly movable against said resilient means to effect compression thereof in response to the established fluid pressure at said outlet port acting on said reaction areas, said other valve control member being independently movable to a disabled position in said housing upon the subjection of said ratio area to fluid pressure in excess of a predetermined amount at said ratio port and said one valve control member being thereafter independently movable in response to the compressive force of said resilient means to further actuate said valve means and adjust the magnitude of the fluid pressure at said outlet port effective on only the reaction area of said one valve control member in a predetermined ratio with that established upon the concerted movement of said valve control members effective on both of the reaction areas of said valve control members.

9. A manually actuated application valve for fluid pressure comprising a housing, a pair of piston means concertedly and independently movable in said housing and having opposed faces, an outlet chamber in said housing adjacent to one of the opposed faces of said piston means, a ratio chamber in said housing adjacent to the other of the opposed faces of one of said piston means for selective connection with the atmosphere and a fluid pressure, an inlet chamber in said housing for pressure fluid communication with said outlet chamber, valve means controlling pressure fluid communication between said inlet and outlet chambers, said piston means being concertedly movable in response to a manually applied force to engage and move said valve means to a position communicating said inlet and outlet chambers and establishing an output fluid pressure in said outlet chamber, the output fluid pressure acting on said one opposed faces of both of said piston means to oppose further concerted movement thereof, said one piston means being independently movable to a disabled position in said housing in response to fluid pressure in said ratio chamber acting on said other opposed face of said one piston means, and the other of said piston means being independently movable to actuate said valve means and adjust the magnitude of the output fluid pressure acting on said one opposed face of said other piston means in opposition to the manually applied force in a predetermined proportion with that of the output fluid pressure acting on said one opposed faces of both of said piston means in opposition to the manually applied force.

References Cited by the Examiner

UNITED STATES PATENTS

| | | | |
|---|---|---|---|
| 1,626,607 | 5/1927 | Fowler | 91—434 |
| 2,137,954 | 11/1938 | Sanford et al. | 91—434 |
| 3,076,441 | 2/1963 | Ayers | 91—434 |

SAMUEL LEVINE, *Primary Examiner.*

P. E. MASLOUSKY, *Assistant Examiner.*